Nov. 5, 1935.                J. F. DUFFY                2,019,663
                            RUNNING BOARD
                         Filed May 13, 1935
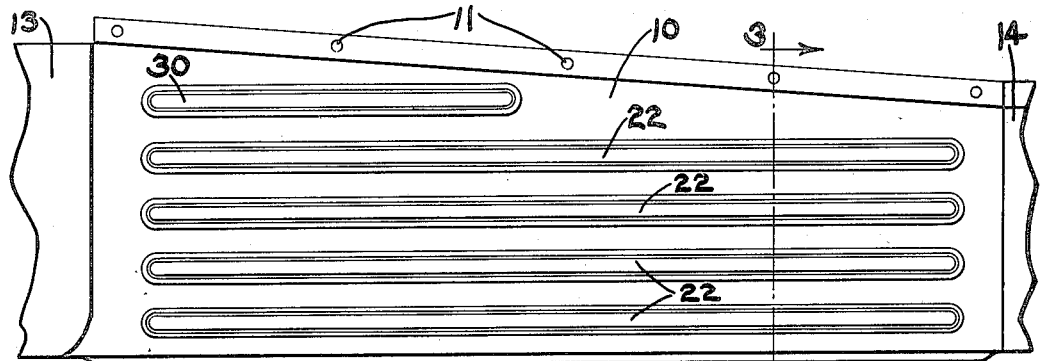
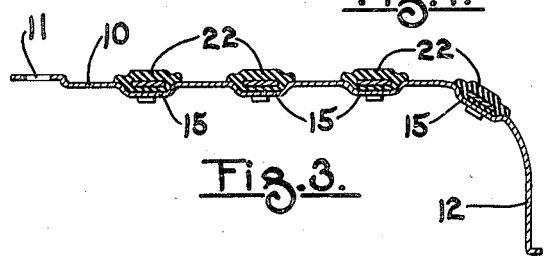
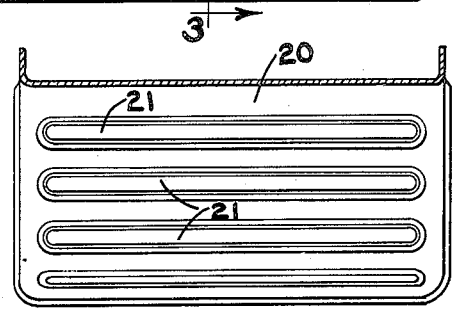
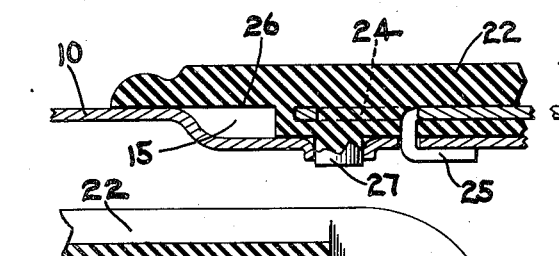
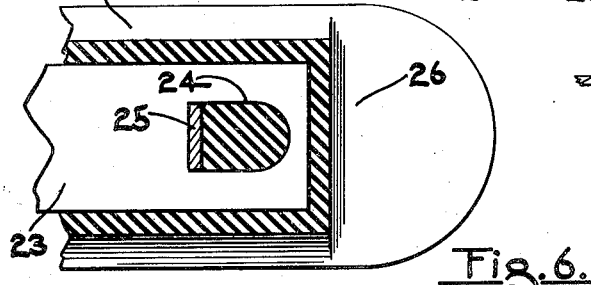
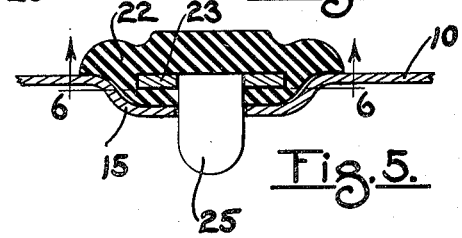
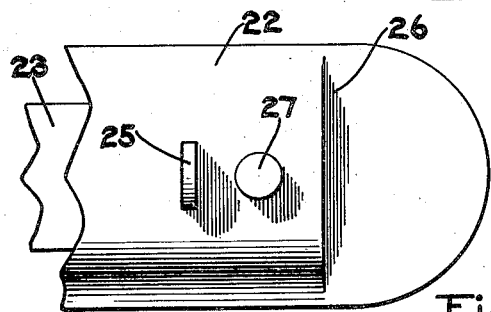
Inventor
James Francis Duffy
By Lawrance and
Van Antwerp
Attorneys Patented Nov. 5, 1935

2,019,663

UNITED STATES PATENT OFFICE 2,019,663

RUNNING BOARD

James Francis Duffy, Holland, Mich., assignor to Duffy Manufacturing Company, Holland, Mich., a corporation of Michigan Application May 13, 1935, Serial No. 21,224

4 Claims. (Cl. 280—163)

This invention relates generally to a step construction and more particularly to an automobile running board construction.

In my construction the units are not vulcanized in place and consequently can be readily replaced or interchanged whenever necessary or desirable.

Another advantage of my construction, and this advantage is deemed a very important one, lies in the fact that the running board or the like is of relatively simple construction, having only longitudinally extending shallow grooves formed therein. Thus the stamping process for manufacturing my running board is simple and this keeps down the expense of manufacture as well as difficult stamping operations are eliminated.

Another feature of my construction lies in the exposing of the edges of the strips of rubber whereby they are not fixed in position but can yield under rather excessive strains but will returns to their original and proper position after the strain or impact is removed or has ceased. Thus the rubber strips retain their neat looking appearance for a relatively long period of time.

Other features and advantages will become apparent as the description proceeds.

In the drawing:—

Fig. 1 is a plan view of a running board made in accordance with my invention.

Fig. 2 is a plan view of a step having my invention shown therein.

Fig. 3 is a cross sectional view taken along the line 3—3 of Fig. 1.

Fig. 4 is a longitudinal sectional view taken through either Fig. 1 or Fig. 2.

Fig. 5 is a cross sectional view taken at right angles to Fig. 4.

Fig. 6 is a sectional view taken along the line 6—6 of Fig. 5.

Fig. 7 is an underplan enlarged view showing one end of the step construction.

Like numerals refer to like parts throughout the several views.

Referring particularly to Figs. 1 and 3, numeral 10 indicates the sheet metal running board having attaching openings 11 at its inner side and a depending flange 12 at its outer side. A rear fender 13 abuts the running board at one end and a front fender 14 at the other end. The running board 10 is stamped to form longitudinally extending grooves 15, these grooves preferably being located in parallelism and being of any desired length. The outermost groove 15 is located at the shoulder between the flange 12 and the horizontally extending portion of the running board. If desired, this may be located entirely within the vertical portion 12 whereby the rubber member located therein serves as a bumper under certain conditions.

Referring to Fig. 2, numeral 20 indicates a sheet metal construction which likewise has parallel grooves or depressions formed therein to receive rubber elements. The rubber elements, designated by numeral 21 in this figure, are substantially the same as those utilized in the other modifications.

Numeral 22 indicates one of the rubber tread members. These tread members receive a sheet metal reinforcing bar 23 having openings 24 formed therein due to the prongs 25 being stamped from the reinforcing bar 23. The rubber is molded around this reinforcing bar and flows through the openings 24 and is of the cross sectional shape shown in Fig. 5. The ends of the rubber elements 22 are cut away as shown at 26, see Figs. 4, 6 and 7 and this eliminates the necessity for any particular fit between these rubber elements 22 and the slot or groove into which they fit. Also, depending projections 27 are formed at or near the ends of the rubber elements 22.

Referring to Fig. 1, numeral 30 indicates a tread which is similar in cross section to the treads 22 but which is simply made shorter in length. Also, this tread 30 may be of lesser or greater height than the remaining treads or, if desired, the treads may have different thicknesses in order to cause a slight upward or downward slope to the running board.

The running board 10, with its depressed portions 15, has openings through the bottoms of these depressions in order to permit the passage of the prongs 25 and the rubber projections 27. During assembly these manipulations are made and the prongs 25 are bent over so as to clamp the tread to the fender and form a neat looking running board, the top surface of the running board between the treads being treated as desired.

It will be noted that the reinforcing strip does not extend to the outer edges of the tread member, see Fig. 4, and thus the edges have a certain desirable elasticity which permits their displacement under certain conditions but which will, nevertheless, return to their proper position under normal conditions.

The invention is defined in the appended claims and is to be considered comprehensive of all forms of structure coming within their scope.

I claim:

1. A running board or the like comprising a sheet of metal having a plurality of shallow grooves therein, said sheet metal being flat around and between the grooves, openings through the bottoms of the plurality of grooves, rubber elements in the said grooves, said rubber elements having yieldable flaps integrally formed therewith and extending over the flat surface of the adjacent sheet metal and being slidable thereon for the purpose described and fastening means extending from each of the rubber elements through the openings to hold the elements in position.

2. A running board or the like as recited in claim 1 in which the cross sectional shape of the lower portion of each of the rubber elements is scant as regards the cross sectional shape of its receiving groove whereby the flaps always tightly contact the adjacent flat surface.

3. A running board as set forth in claim 1 in which the ends of the several rubber elements are undercut to form spaces between the rubber elements and the ends of the several grooves.

4. A running board as set forth in claim 1 in which the rubber element has a cylindrical depending projection received in one of the openings through the bottom of the groove.

JAMES FRANCIS DUFFY.